United States Patent [19]

Tanaka et al.

[11] Patent Number: 4,627,867
[45] Date of Patent: Dec. 9, 1986

[54] METHOD FOR PRODUCING HIGHLY PURE GLASS PREFORM FOR OPTICAL FIBER

[75] Inventors: Gotaro Tanaka; Hiroo Kanamori; Futoshi Mizutani, all of Yokohama, Japan

[73] Assignee: Sumitomo Electric Industries, Ltd., Osaka, Japan

[21] Appl. No.: 708,051

[22] Filed: Mar. 4, 1985

[30] Foreign Application Priority Data

Mar. 7, 1984 [JP] Japan .................................. 59-43640

[51] Int. Cl.⁴ ..................... C03B 37/018; C03B 19/06
[52] U.S. Cl. ......................................... 65/3.12; 65/18.2
[58] Field of Search ................................ 65/3.12, 18.2

[56] References Cited

U.S. PATENT DOCUMENTS 4,230,472 10/1980 Schultz .............................. 65/18.2 X
4,294,601 10/1981 Dabby et al. ........................ 65/3.12
4,310,339 1/1982 Blankenship ........................ 65/3.12
4,363,647 12/1982 Bachman ............................ 65/18.2
4,378,985 4/1983 Powers .............................. 65/18.2 X

FOREIGN PATENT DOCUMENTS 54-02653 2/1979 Japan ................................... 65/18.2

Primary Examiner—Kenneth M. Schor
Attorney, Agent, or Firm—Cushman, Darby & Cushman

[57] ABSTRACT

A method for producing a glass preform for an optical fiber by an outside vapor-phase deposition method, which comprises forming fine glass particles by jetting gaseous glass raw material and fuel gas from a first burner to deposit the particles on a seed rod to form a soot rod at such a temperature that a specific bulk density of the soot rod being formed is low and subsequently heating the soot rod by a second burner so as to increase the bulk density of the soot and then sintering the soot rod to obtain a transparent glass preform for an optical fiber, by which method, a highly pure glass preform is produced in a good deposition yield without cracking.

1 Claim, 3 Drawing Figures

METHOD FOR PRODUCING HIGHLY PURE GLASS PREFORM FOR OPTICAL FIBER

FIELD OF THE INVENTION

The present invention relates to a method for producing a highly pure glass preform for an optical fiber. More particularly, it relates to an improved method for producing a highly pure glass preform for an optical fiber by an outside vapor-phase deposition method (hereinafter referred to as "OVD" method).

BACKGROUND OF THE INVENTION

One of the conventionally employed methods for producing a glass preform is a so-called OVD method (cf. Japanese Patent Kokai Publication (unexamined) Nos. 73522/1973 and 18909/1974). The OVD method comprises oxidizing the glass raw material such as SiCl$_4$ in an oxidizing flame to form fine glass particles of, for example, SiO$_2$ and depositing the fine glass particles in a predetermined amount on a seed rod (e.g. a preinstalled core glass rod, a supporting mandrel which is to be removed before or after sintering of the glass preform, etc.) to form a soot rod of the fine glass particles and then sintering the soot rod in a suitable atmosphere to obtain a transparent melt glass preform for an optical fiber. According to the conventional OVD method, the highly pure glass preform is produced in a comparatively high productivity, and dehydration of the glass preform and/or addition of an additive is effectively carried out during sintering since the deposition and sintering steps are separately performed.

However, the conventional OVD method has some drawbacks, that is, if a surface temperature of the soot rod is low in the deposition step, the soot rod tends to crack while the deposition yield of the fine glass particles is improved. If the surface temperature of the soot rod is high, the deposition yield is decreased while the soot rod does not crack.

SUMMARY OF THE INVENTION

One object of the present invention is to provide an improved OVD method which overcomes the drawbacks of the conventional OVD method.

Another object of the present invention is to provide an improved OVD method by means of which a highly pure glass preform for an optical fiber is produced without cracking in a good yield.

These and other objects are achieved by the improved OVD method of the invention which comprises forming fine glass particles by jetting gaseous glass raw material and fuel gas from a first burner to deposit the particles on a seed rod to form a soot rod at such a temperature that a bulk density of the soot being formed is low and subsequently heating the soot rod by a second burner so as to increase the bulk density of the soot and then sintering the soot rod to obtain a transparent glass preform for an optical fiber.

DETAILED DESCRIPTION OF THE DRAWINGS

The present invention will be illustrated by making reference to the accompanying drawings by way of example.

Figure 1:
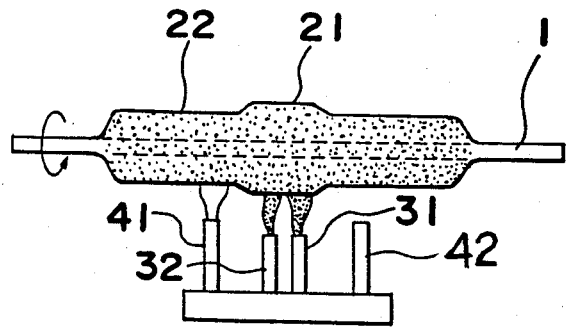
FIG. 1 shows one embodiment of an apparatus for practicing the method of the present invention.

Now, referring to FIG. 1 which shows one embodiment of an apparatus for practicing the method of the invention, around a seed rod 1 which rotates in a direction of an arrow, a soot rod 21 having a low bulk density is formed by jetting a glass raw material and a fuel gas from a pair of burners 31 and 32 for forming the glass fine particles, which may be a single burner or three or more burners. The thus formed soot rod is subsequently heated by a heating burner 41. In FIG. 1, the burners 31, 32 and 41 horizontally travel in a direction of an arrow and thus the formed part of the soot rod 22 is heated by the heating burner 41 and its bulk density is adjusted. When the burners travel in an opposite direction of the arrow, a burner 42 is used in place of the burner 41 for heating the soot rod. Instead of travelling the burner, the soot rod may be horizontally moved.

Figure 2:
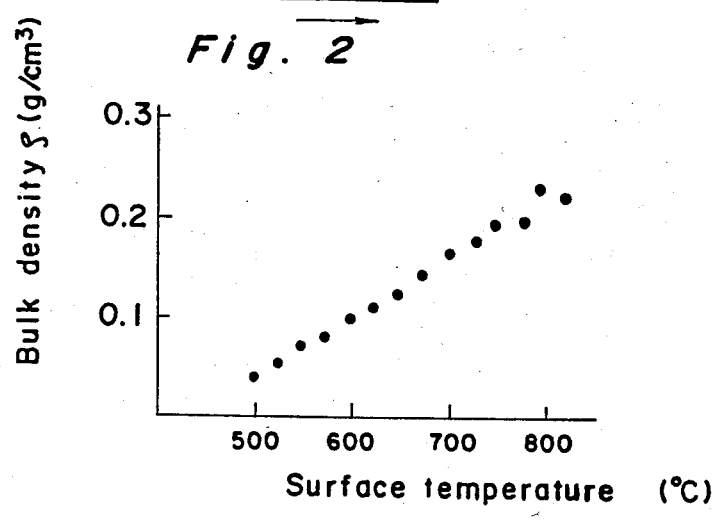
FIG. 2 is a graph showing a relationship between the bulk density of the soot and the surface temperature of the soot rod.

The deposition yield of the soot depends on the outer diameter of the seed and also on the surface temperature of the soot rod in the deposition step. However, it is very difficult to measure the absolute value of the surface temperature of the soot rod. Now, the present inventors have found that the surface temperature and the bulk density of the soot have a good relationship as shown in FIG. 2 in which the soot consists of SiO$_2$. Therefore, the bulk density of the soot can be used as a secondary parameter of the surface temperature of the soot rod.

Figure 3:
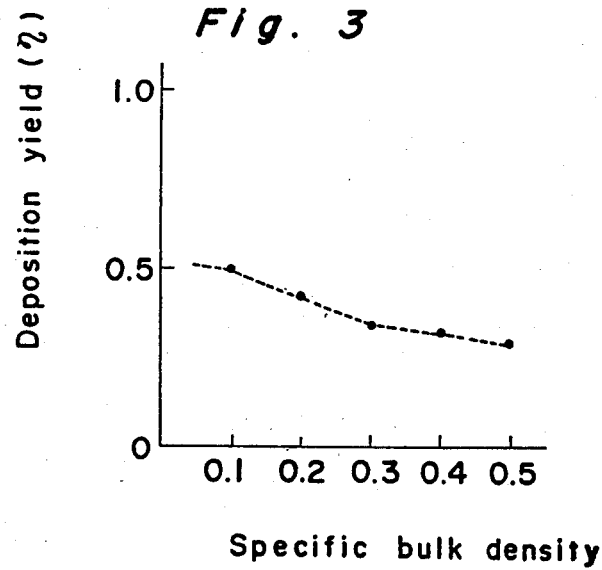
FIG. 3 is a graph showing a relationship between the deposition yield and the specific bulk density.

FIG. 3 shows the change of the deposition yield ($\eta$) with varying the specific bulk density, $\rho/\rho_0$ (wherein $\rho$ is a bulk density of the soot rod and $\rho_0$ is a bulk density of perfectly sintered glass) of the soot which is produced by reacting SiCl$_4$ with the fuel gas comprising hydrogen and oxygen. As is seen from FIG. 3, the deposition yield monotonously decreases as the specific bulk density is increased. When a thick layer of the fine glass particles having the specific bulk density of about 0.1 is deposited on the seed, the soot rod is apt to crack and the yield of the good soot is decreased.

In the present invention, the raw materials may be any of known glass raw materials such as SiCl$_4$, GeCl$_4$, etc.

In the preferred embodiment of the present invention, firstly the soot rod having the low specific bulk density of from 0.02 to 0.1 is formed and then the bulk density is increased to from 0.15 to 0.5. In order to increase the deposition yield of the soot, the specific bulk density of 0.1 or less is preferred. However, when the specific bulk density is less than 0.02, the bulk density becomes non-uniform or the soot rod tends to crack during the subsequent heating step to increase the bulk density. In the step of increasing the bulk density, when the specific bulk density is larger than 0.5, dehydration of the soot rod in the sintering step may become difficult or the resultant glass preform is apt to contain bubbles. When it is less than 0.15, the soot rod tends to crack in the sintering step or the heating efficiency is deteriorated.

The thus produced soot rod is then sintered by a per se conventional method to convert it to a transparent glass preform for a optical fiber.

The present invention will be hereinafter explained in detail by following Examples.

EXAMPLE 1

Around a seed rod of pure $SiO_2$ having an outer diameter of 10 mm, a glass raw material carried by a nitrogen carrier gas and a fuel gas containing hydrogen, oxygen and nitrogen were jetted at rates shown in Table 1 from a corresponding port of the synthesizing burner having coaxially positioned four cylindrical ports under such conditions that a soot rod of $SiO_2$ fine particles having a specific bulk density of 0.1 was produced. On each side of the synthesizing burner, a burner for adjusting the bulk density of the soot rod was positioned and gases shown in Table 2 was burned by this burner to heat the formed soot rod to increase its specific bulk density to 0.2. An average deposition yield of the soot rod of the fine glass particles was about 60%.

The produced soot rod had high purity, but no crack.

TABLE 1

| Gas | Jetting rate (liter/min.) |
| --- | --- |
| $SiCl_4$ | 0.5 |
| $H_2$ | 4 |
| $O_2$ | 4 |
| $N_2$ | 2 |

TABLE 2

| Gas | Jetting rate (liter/min.) |
| --- | --- |
| $H_2$ | 6 |
| $O_2$ | 6 |
| $N_2$ | 2 |

COMPARATIVE EXAMPLE 1

In the same manner as in Example 1 but jetting the glass raw material and the fuel gas at jetting rates shown in Table 3 and using no burner for adjusting the bulk density of the soot, a soot rod was produced. While the specific bulk density was about 0.2, the average deposition yield was about 45%.

TABLE 3

| Gas | Jetting rate (liter/min.) |
| --- | --- |
| $SiCl_4$ | 0.5 |
| $H_2$ | 10 |
| $O_2$ | 10 |
| $N_2$ | 2 |

COMPARATIVE EXAMPLE 2

In the same manner as in Example 1 but using no burner for adjusting the bulk density of the soot, a soot rod was produced. When the outer diameter of the soot rod reached to 70 mm, the supply of the raw material, oxygen and hydrogen was terminated. The soot rod cracked.

While the present invention has been described by reference to what is believed to be the most practical embodiments, it is understood that the invention may embody other specific forms not departing from the spirit of the invention. The present embodiments, therefore, should be considered in all respects as illustrative and not limited to the details disclosed herein but are to be accorded the full scope of the claimed claims so as to embrace any and all equivalent methods.

What is claimed is:

1. A method for producing a glass preform for an optical fiber by an outside vapor-phase deposition method, which comprises the steps of:

forming glass soot particles by jetting and combusting gaseous glass-forming raw material and fuel gas from a first burner, in the presence of oxygen, depositing the particles on a seed rod with control being provided so as to form a soot rod at such a temperature that a specific bulk density $\rho/\rho 0$, wherein $\rho$ is a bulk density of the soot rod and $\rho 0$ is a bulk density of perfectly sintered glass, of the soot rod being formed is from 0.02 to 0.1, subsequently heating the soot rod by a second burner with control being provided so as to increase the bulk density of the soot rod to from 0.15 to 0.5, and then sintering the soot rod to obtain a transparent glass preform for an optical fiber.

* * * * *